United States Patent [19]

Worthington

[11] 4,154,104

[45] May 15, 1979

[54] COMFORT INDEX APPARATUS

[76] Inventor: Mark N. Worthington, 10227 White Mtn. Rd., Sun City, Ariz. 85351

[21] Appl. No.: 885,289

[22] Filed: Mar. 10, 1978

[51] Int. Cl.² ............................................. G01W 1/02
[52] U.S. Cl. ...................................... 73/336; 73/189; 73/339 C
[58] Field of Search ................. 73/339 C, 338, 336, 73/189, 338.6

[56] References Cited

U.S. PATENT DOCUMENTS

| 2,120,952 | 6/1938 | Parsons | 73/336 |
| 3,771,364 | 11/1973 | Worthington | 73/336 |

*Primary Examiner*—Donald O. Woodiel
*Attorney, Agent, or Firm*—Herbert E. Haynes, Jr.

[57] ABSTRACT

An apparatus for sensing temperature, humidity, air movement and mean radiation so that those factors which effect human comfort may be correlated to determine effective temperatures. The apparatus includes a thermometer which is capable of simultaneously sensing dry bulb temperature, wet bulb temperature and mean radiation to produce a temperature reading indicative of the combination of those factors. Wind speed indicators are provided for use with temperature correction charts so that the air movement factor can be correlated with the temperature, humidity and mean radiation factors to arrive at a comfort index, or effective temperature.

9 Claims, 11 Drawing Figures

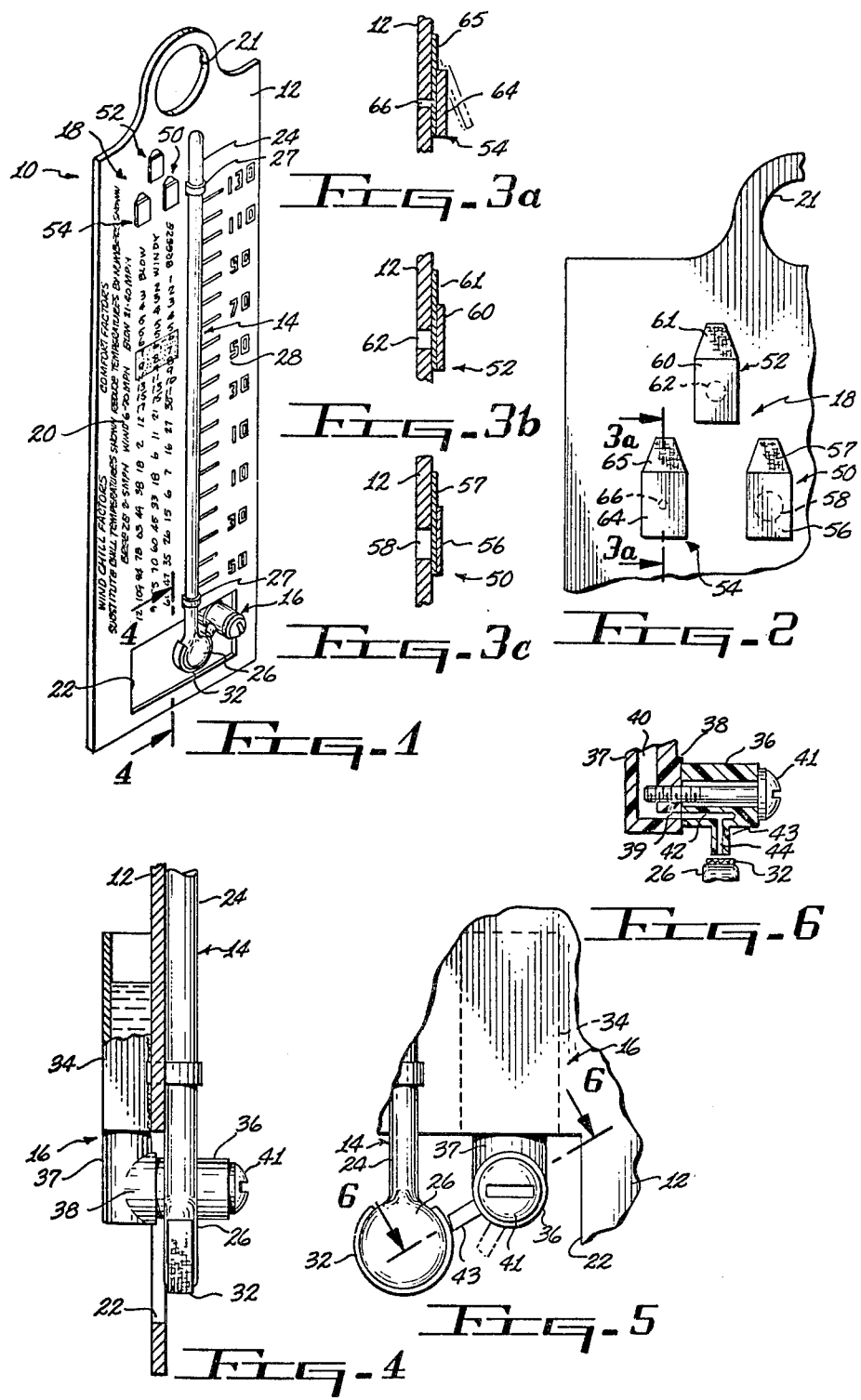

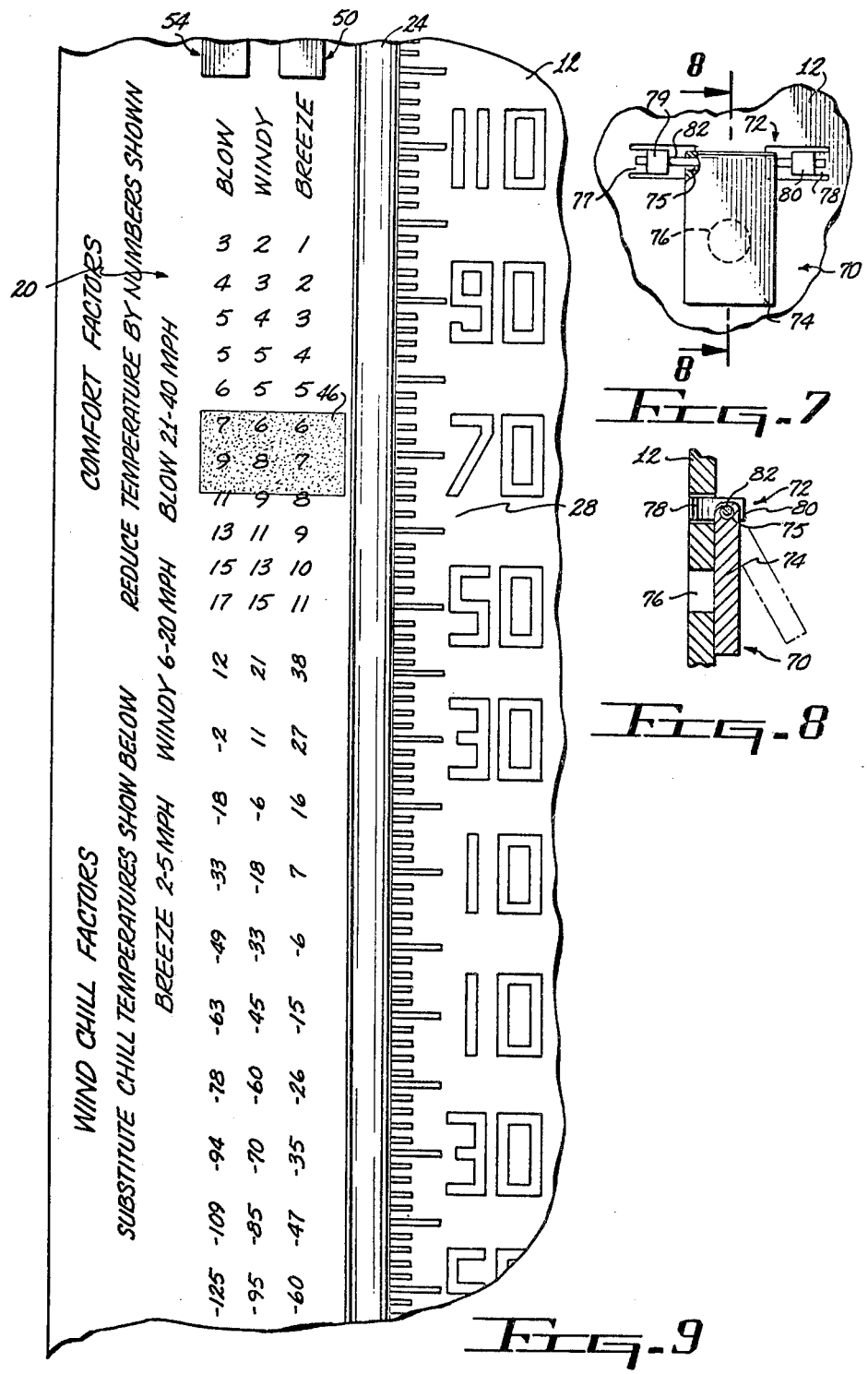

COMFORT INDEX APPARATUS

BACKGROUND OF THE INVENTION

1. Field of the Invention

This invention relates to devices for sensing ambient air conditions, and more particularly to an apparatus for sensing the various ambient conditions which effect human comfort so that the sensed conditions may be correlated to arrive at a comfort index, or effective temperature.

2. Description of the Prior Art

The ambient air conditions which determine the comfort of human beings includes the basic factors of air temperature, humidity, air movement and mean radiation. Each of these factors are mutually interrelated and have a direct bearing on the comfort of human beings.

It is well recognized that a person may experience varying degrees of comfort at a particular temperature. For example, at a given temperature, if the humidity is high, a greater degree of discomfort is felt as compared to the same temperature at a lower humidity. In addition to temperature, humidity and mean radiation, comfort is effected by movement of the surrounding air.

In U.S. Pat. No. 3,095,742, a direct reading comfort index thermometer is disclosed which includes a thermometer one-half of the bulb of which is covered by a moisture absorbing fabric in the form of a wick. The wick extends into a water reservoir and moisture is thus conducted, or wicked, to that portion of the wick which is in contact with the bulb of the thermometer. The uncovered portion of the bulb senses dry bulb temperature and the covered portion senses wet bulb temperature with the result that the thermometer will correlate those two sensed temperatures and produce a reading at a point about half way therebetween. This prior art device is relatively complex due to the structural arrangements of the wick and the reservoir, and the proximity of the water reservoir to the blub can cause distortion in the accuracy of the device. Further, this device makes no provisions for the effects of ambient air movements on the comfort of human beings.

In general, most comfort index devices are similar to the above described particular device in that they make no provisions for consideration of air movement and mean radiation, and are intended for use only during warm seasons of the year.

In U.S. Pat. No. 3,771,364, issued to me on Nov. 13, 1973, I disclosed a comfort index thermometer which overcomes some of the problems and shortcomings of prior art devices. In my patented structure, I employ a thermometer having its bulb partially covered with an absorbent material which is moistened when desired by opening a simple valve means that delivers water from a water reservoir, with the reservoir being disposed so as to be remote from the bulb. In this manner, the structure is exceptionally simple and no distortion of the sensed readings results from the proximity of the reservoir. Further, this structure is provided with a chart alongside the thermometer, which shows corrections that are to be made in the reading of the thermometer to allow for various air movement conditions. Thus, my patented device takes into account air temperature, humidity and air movement, the factors which effect human comfort. However, that device does not efficiently sense mean radiation, and no means for determining wind velocity is provided. Therefore, the user must rely either on guess work or on obtaining of wind speed data from other sources. The disadvantage of employing guess work is obvious, and since air movements will vary from place to place, data obtained such as from radio weather reports and the like is unreliable. Thus, a user desiring accurate, or fairly accurate, comfort index readings has no choice but to purchase a separate wind speed sensing instrument.

Therefore, a need exists for a new and improved comfort factor apparatus which overcomes some of the problems and shortcomings of the prior art.

SUMMARY OF THE INVENTION

In accordance with the present invention, a new and improved comfort factor apparatus is disclosed as including a conventional thermometer which may be adapted to simultaneously sense wet bulb temperature, dry bulb temperature and mean radiation to produce a reading indicative of the correlation of those factors. The comfort factor apparatus also includes wind speed indicators which in conjunction with temperature correcting charts, is employed to determine the effects of air movement on the reading produced by the thermometer.

More specifically, the apparatus of the present invention includes a panel upon which the thermometer is mounted. A water reservoir may be mounted on the back of the panel and by means of a valve, water may be optionally delivered to an absorbent material which partially covers the thermometer's bulb. The exposed, or dry portion of the bulb senses mean radiation and dry bulb temperature, i.e., air temperature alone without considering the effect of humidity. The covered portion of the bulb, when the absorbent material is wet, will sense wet bulb temperature and thus will sense the temperature as effected by humidity. With both the wet bulb and dry bulb temperatures being sensed simultaneously by the same thermometer, the resulting reading, indicated by the column of temperature responsive fluid in the thermometer, will lie about half way between the wet bulb and dry bulb temperatures and the effects of mean radiation will, of course, effect that reading. As is known, both humidity and air movement effect the rate of evaporation, and this the wet bulb temperature. To achieve accurate wet bulb readings, and for effective sensing of mean radiation, the panel upon which the thermometer is mounted is open in the vicinity of the thermometer's bulb to eliminate any blocking of air movements therearound, and to enable sensing of mean radiation from all directions.

The wind speed indicators of the present invention include a plurality of flaps which are suspendingly mounted on hinge means carried on the panel of the comfort factor apparatus. Each of the flaps are disposed to overlay a different aperture formed in the panel so that air movement passing thorough the apertures will impinge upon the flaps. The flaps and their associated apertures are configured so that air speeds at various velocities will cause fluttering of the different flaps.

In the embodiment shown, one flap and its associated aperture are configured so that the flap will respond to air movements in the range of from two to five miles per hour. A second flap and its associated aperture will produce flap movements in response to air speeds in the range of from six to 20 miles per hour, and a third flap and its associated aperture are configured so that the flap will respond to air speeds of 21 miles per hour and above.

Temperature correcting charts are provided on the panel of the comfort factor apparatus so that when air speed has been determined by the above described air speed indicators, that data is used in conjunction with the chart to determine the corrections that need to be made in the reading of the thermometer to arrive at an effective temperature which reflects all of the factors which determine human comfort, with the effective temperature being referred to as the comfort factor.

Accordingly, it is an object of the present invention to provide a new and improved comfort index apparatus.

Another object of the present invention is to provide a new and improved comfort index apparatus which is simple to operate and inexpensive to manufacture.

Another object of the present invention is to provide a new and improved apparatus for sensing all of the ambient conditions which effect human comfort and allowing correlation of the sensed data to arrive at an effective, or comfort index temperature reading.

Another object of the present invention is to provide a new and improved comfort index apparatus which may optionally be employed to sense all of the ambient conditions which effect human comfort, or may be operated as a conventional thermometer to sense air temperature only.

Another object of the present invention is to provide a new and improved comfort index apparatus of the above described character which includes a thermometer that is capable of simultaneously sensing dry bulb temperature, wet bulb temperature and mean radiation to produce a temperature reading indicative of those factors, and also includes wind speed indicators and temperature correcting charts that allows wind speed data to be correlated with the thermometer reading to produce an effective, or comfort factor temperature reading.

Another object of the present invention is to provide a new and improved comfort index apparatus of the above described character which efficiently senses mean radiation by employing a dark colored temperature responsive fluid in the thermometer and positioning the thermometer's bulb so that it will sense light and heat radiation from all directions.

Another object of the present invention is to provide a new and improved apparatus of the above described type in which the wind speed indicators comprise at least one flap suspendingly mounted on hinge means carried on the apparatus panel so as to overlay an aperture formed in the panel with the flap and aperture configured so that air moving through the aperture at a predetermined speed will impinge upon the flap and cause fluttering thereof.

Still another object of the present invention is to provide new and improved wind speed indicators which are simple to operate and inexpensive to manufacture.

Yet another object of the present invention is to provide a new and improved wind speed indicators which include a panel having a plurality of flaps hingedly suspended thereon with each flap overlaying a different one of a plurality of apertures formed through the panel so that air moving the apertures will impinge upon the flaps, the flaps and their associated apertures being configured so that air speeds in various ranges will cause fluttering of different ones of the flaps.

in conjunction foregoing and other objects of the present invention, as well as the invention itself, will be more fully understood from the following description when read inconjunction with the accompanying drawings.

BRIEF DESCRIPTION OF THE DRAWINGS

FIG. 1 is an isometric view of the comfort index apparatus of the present invention showing the various features thereof.

FIG. 2 is an enlarged fragmentry orthographic view showing the wind speed indicator of the present invention.

FIG. 3a is a fragmentary sectional view taken along the line 3a—3a and showing one of the flaps and its associated aperture which form part of the wind speed indicator of the present invention.

FIG. 3b is a fragmentary sectional view similar to FIG. 3a and showing a different one of the flaps and its associated aperture.

FIG. 3c is a fragmentary sectional view similar to FIG. 3a and showing still another one of the flaps and its associated aperture.

FIG. 4 is an enlarged sectional view taken along the line 4—4 of FIG. 1.

FIG. 5 is a fragmentary orthographic view of that portion of the apparatus shown in FIG. 4.

FIG. 6 is a fragmentary sectional view taken along the line 6—6 of FIG. 5.

FIG. 7 is a fragmentary orthographic view showing a modified form of the wind speed indicator of the present invention.

FIG. 8 is a fragmentary sectional view taken along the line 8—8 of FIG. 7.

FIG. 9 is an enlarged fragmentary orthographic view showing the temperature correcting chart which forms part of the apparatus of the present invention.

DESCRIPTION OF THE PREFERRED EMBODIMENTS

Referring more particularly to the drawings, FIG. 1 illustrates the comfort index apparatus of the present invention which is indicated generally by the reference numeral 10.

As will hereinafter be described in detail, the comfort index apparatus 10 includes a panel 12, an especially configured thermometer 14, a water reservoir and dispensing means 16, wind speed indicator means 18, and temperature correction chart 20.

The panel 12 is fabricated of any suitable material such as metal or plastic, and is preferably a planar structure of elongated rectangular shape having a circular aperture 21 formed on one end thereof so that the apparatus 10 may be suspendingly hung in an appropriate location as is common with conventional temperature sensing devices. As will hereinafter be described, the panel 12 is formed with an opening 22 adjacent the end thereof which is opposite to the circular aperture 21.

The thermometer 14 is essentially conventional in that it is formed with an elongated transparent tube 24 which is provided with a bulb-like enlargement 26 on one end. In accordance with accepted practices, the thermometer 14 is mounted on the panel 12, such as by suitable clips 27, and is disposed thereon to be properly oriented and coextensive with respect to a temperature scale 28 which is printed or otherwise provided on the front surface of the panel 12. It should be noted that the scale 28 could be suitably displayed on the tube 24. As is well known, the bulb 26 of the thermometer 14 is a reservoir for a thermally sensitive fluid (not shown)

such as red alcohol, or any other dark colored liquid which is volumetrically effected by changes in temperature. The temperature sensed by the thermometer 14 will cause the thermally sensitive fluid (not shown) to volumetrically expand to form a column in the tube 24 with the top of that column aligning with one of the calibration marks of the scale 28 to provide a reading of the sensed temperature.

The thermometer 14 is especially configured in that a water absorbent material 32 is affixed, such as with a suitable adhesive, to the bulb 26 so as to cover a predetermined portion thereof. The material 32 is applied to the bulb 26 so that when wetted, as will hereinafter be described, the thermometer will sense wet bulb temperature in addition to dry bulb temperature.

As is known, dry bulb temperature is the actual temperature of the ambient air as sensed by conventional thermometers, and wet bulb temperature reflects the cooling effects of evaporation. Thus, with the thermometer 14 sensing both dry bulb temperature and wet bulb temperature, the two opposing temperatures will both act on the thermally sensitive fluid of the thermometer which, as will hereinafter be described, is calibrated to result in a reading about half way between the two.

Since air movements, as well as humidity, effect the rate of evaporation, the thermometer 14 is mounted on the panel 12 so that the bulb 26 is disposed in the opening 22 formed through the panel. In this manner, air circulation in the vicinity of the bulb 26 will not be obstructed and thus an accurate sensing of wet bulb sensing is achieved. That same opening 22 also allows the thermometer to sense mean radiation from all directions.

Wetting of the absorbent material may be accomplished in any convenient manner such as by employing an eye dropper, (not shown), a wet stick or the like. However, for purposes of convenience, it is preferred that the apparatus 10 be provided with the water reservoir and dispensing means 16, which as seen best in FIGS. 4, 5 and 6 includes a water tank 34 suitably affixed on the back of the panel 12 so as to be disposed above the opening 22 formed therethrough. The tank 34 is opened at its upper end to receive water, and has a manually operated shutoff valve 36 at its lower end. The tank 34 is provided with a depending tubular member 37 which is closed at its bottom and has a normally extending boss 38. The boss 38 has an eccentrically disposed passage 39 formd therethrough which is in communication with the axial bore 40 of the depending tubular member 37. The shutoff valve 36 is affixed in axial alignment with the boss 38 by a screw 41 with the valve being rotatable about the screw. An eccentrically disposed passage 42 is formed through the valve 36 and is disposed to align with the passage 39 of the boss when the valve is in its open position, as seen in FIG. 6, and will be rotated out of alignment therewith when the valve is closed. The valve is provided with a normally extending spout 43 having a passage 44 formed therein which communicates with the passage 42. The valve 36 extends from the tubular member 37 through the opening 22 formed in the panel 12, and is disposed laterally adjacent and somewhat above the bulb 26 of the thermometer 14. When the valve is in its open position, its spout 43 will be in engagement with the absorbent material 32 to deliver water from the tank 34 thereto. Rotation of the valve 36 will move the spout 43 out of engagement with the absorbent material 32 and the eccentric passages 39 and 42 will be moved out of alignment with each other thus shutting off the flow of water through the valve.

It will now be seen that by wetting the absorbent material 32, the thermometer 14 will simultaneously sense dry bulb and wet bulb temperatures. It should be noted that after the material 32 has been wetted, a period of time such as from three to five minutes, should be allowed to pass to insure accurate readings.

Should it be desired not to sense the wet bulb temperature, such as in weather when the wetted absorbent material 32 would freeze, the apparatus 10 can be operated as a conventional thermometer by simply not wetting the absorbent material.

Ordinarily, the readings produced by the thermometer 14 when it is simultaneously sensing wet and dry bulb temperatures, will reflect the comfort or discomfort being experienced by an average person. It may vary to some small degree with different people, however, the readings produced by the thermometer 14 will reflect an average which is the mean of the wet and dry bulb temperatures, and the thermometer 14 is calibrated in a calm air environment so as to closely approximate the effective temperature curves established by the American Society of Heating and Ventilating Engineers. Such calibration is accomplished by covering more or less of the bulb 26 with the absorbent material 32 until proper readings are accomplished. Due to the dark temperature responsive fluid in the thermometer, and the exposed condition of the bulb, the thermometer will efficiently sense mean radiation from nearby objects such as walls, floors and other objects so that this radiation in the form of heat and light will effect the thermometer's reading.

It is an established fact that moving ambient air will cause a person's body to feel cooler than it would otherwise feel in conditions of calm air. Therefore, the temperature correction chart 20 is provided to take into account the movement of air and correlate the cooling effects thereof with the temperature readings produced by the thermometer 14.

As hereinbefore mentioned, if water is applied to the absorbent material 32 at relatively low temperatures, freezing may result. Therefore, it is recommended that the thermometer 14 be operated as a conventional thermometer at air temperatures below about 40° F. as read on the scale 28.

Accordingly, the temperature correction scale 20, as seen best in FIG. 9, is divided into two segments with the lower segment reflecting wind chill factors to be applied to the thermometer readings of about 40° and lower, as will hereinafter be described, and the upper segment of the scale contains correction factors for the cooling effects of air to be correlated with the comfort index readings of the thermometer 14 at temperatures above 40° F. when the thermometer is simultaneously sensing wet and dry bulb temperatures.

The correction factors displayed in the upper segment of the scale 20 were arrived at under controlled conditions, and each numeral represents the number of degrees to be subtracted from the comfort index reading of the thermometer at specific temperature readings and for specific ranges of wind velocity. It should be understood that the above described correction numerals is but one manner of achieving the desired results. Other ways of accomplishing this same result would be to display those correction factors as percentages or even by the use of temperature curves. The numerical system, however, is preferred as this method is the simplest and most easily understood by the general public.

The following example is given to illustrate how the correction numerals are applied to the comfort index reading and the results thereof. If the comfort index reading displayed by the thermometer is at 89° F., and air movement is in the range of from two to five mph, the right hand column immediately below the word "breeze" is employed to locate the numeral three which is opposite the 89° F. reading of the scale 28. Thus, under those conditions, three degrees are subtracted from the 89° F. reading to produce a corrected reading of 86° F. which is the comfort index reading of the thermometer less the cooling effect of air movement. It will be noted that a box shaped area 46 is suitably identified, such as by being of a contrasting color, in the upper segment of the scale 20, that area 46 lies at a location which is in substantial alignment with the temperatures in the range of from about 65° F. to about 75° F. That area graphically illustrates the temperature range in which most people are comfortable. The corrected comfort index reading of 86° F. of the above example will thus be seen to be approximately 12° above the top of the comfort zone where most people feel comfortable when they are at rest, in the shade and are wearing summer clothing.

The wind chill factors displayed in the lower segment of the chart are similar to the comfort factors described above. The numerals appearing in the wind chill factors segment of the chart 20 were developed by the U.S. Weather Service many years ago and function exactly the same as the above described comfort factor correction numerals.

Several different wind chill charts have been developed by various organizations, such as the U.S. Army, U.S. Navy and others. The U.S. Weather Service Scale is preferred however, due to general acceptance and perhaps due to its being better known to the general public.

Referring now to FIGS. 1, 2, 3a, 3b and 3c wherein the wind speed indicator 18 of the present invention is seen, in the preferred embodiment, to include three individual air speed indicators 50, 52 and 54.

The indicator 50 includes a flap 56 which is seen to be a planar member that is suspendingly affixed to the panel 12 by hinge means 57 so as to overlay an aperture 58 formed through the panel. Similarly, the indicator 52 includes a planar flap 60 suspended by hinge means 61 so as to overlay an aperture 62, and the indicator 54 includes a planar flap 64 suspended by hinge means 65 so as to overlay an aperture 66.

Air moving through the apertures 58, 62 and 66 will impinge on their respective flaps 56, 60 and 64 and cause the flaps to move or flutter when the air speed reaches predetermined velocities. The flap 56 and its associated aperture 58 are sized, or calibrated, to indicate air movement in the range of two to five mph, thus, air moving at speeds above one mph will cause the flap 56 to flutter. The flap 60 and its associated aperture 62 are configured to indicate air speeds in the range of six to 20 mph, thus, the flap 60 will flutter at wind speeds above five mph. The flap 64 will flutter when air moving through its associated aperture 66 has a velocity of above 20 mph and thus indicates air speed above that velocity.

To permit the wind to have full effect on the wind indicator means 18, it is recommended that the apparatus 10 be held at eye level with the back of the panel facing into the wind.

As seen in FIG. 1, the indicator 50 is positioned on the panel 12 so as to be in vertical alignment with the right hand column labelled "breeze" of the temperature correction chart 20, the indicator 52 aligns with the central column identified with "windy" and the indicator 54 aligns with the column labelled "blow". Thus, when the indicator 50 flutters, and the indicators 52 and 54 are not moving, it will be known that air is moving in the two to five mph range and the factors to be used are in the column labelled "breeze When the indicators 50 and 52 are both moving, and indicator 54 is still, wind velocity will be known to be in the range of from six to 20 mph and the correction factors of the column labelled "windy" will be applicable. When all three of the indicators 50, 52 and 54 are fluttering, air speed will be in the range of from 21 to 40 mph and the correction factor in the column labelled "below" will apply.

Sizing, or calibrating, of the individual indicators 50, 52 and 54 is accomplished by selecting the appropriate aperture sizes and weights of the flaps so that the selected combinations will result in the desired responses. Thus, as seen in FIG. 3a, the indicator 54 is provided with a relatively small aperture 66 and its flap 64 is relatively thick or heavy, and that combination requires a wind velocity of 21 to 40 mph to cause fluttering. FIG. 3b shows that the indicator 52 is provided with a relatively larger aperture 62 and its flap 60 is thinner, or lighter, than the flap 64 of indicator 54, and this combination requires air movement in the range of from six to 20 mph to cause fluttering. FIG. 3c shows that indicator 50 is provided with the largest aperture 58 and its flap 56 is the lightest, thus, wind speeds of from two to five mph will cause fluttering.

It will be understood that several variables exist in the structures which make up the individual indicators 50, 52 and 54. Flexibility of the hinge means 57, 61 and 65 is a variable, surface area of the flaps 56, 60 and 64 is another variable, and of course, the size of the apertures 58, 60 and 66 and the weight of the flaps 56, 60 and 64 are variables, and all of those variables effect the operation of the indicators.

The hinge means 57, 61 and 65 shows in FIGS. 1, 2, 3a, 3b and 3c, are substantially triangularly shaped fabric hinges which are affixed to both the panel and flaps such as with a suitable adhesive. Those fabric hinges are but one way of accomplishing the desired results as any flexible member could be employed and as will hereinafter be described, an entirely different hinge arrangement could be utilized.

With regard to the surface area of the flaps 56, 60 and 64, they must have a width and length dimension which covers the apertures and extends beyond the perimeter of the apertures a distance which is sufficient to insure that air moving through the apertures will impinge on the flaps and will not escape around the edges thereof without causing deflection.

When the hinge means and flap surface area are determined, the aperture size and/or weight of the flaps are the variables that are altered to arrive at the proper calibrations. It should be noted that the geometric configuration of the apertures and the material of which the flaps are fabricated are unimportant, in that, a square aperture, for example, will function equally as well as a circular aperture, and all else being equal, a plastic flap will function as well as a metallic flap.

Referring now to FIGS. 7 and 8 wherein a modified form of indicator 70 is shown. The indicator 70 of this embodiment will function in the same manner as the previously described indicators 50, 52 and 54 with the difference being the structure of the hinge means 72. The indicator 70 includes a planar flap 74 having a transverse bore 75 formed therethrough adjacent its top edge. The flap 74 is suspendingly mounted to the panel 12 by hinge means 72 so as to overlay an aperture 76 formed through the panel. The hinge means 72 is formed by stamping, or otherwise cutting the panel 12 above the aperture 76, to form a pair of spaced tabs 77 and 78 which are each integral with the panel 12 on one end thereof and are each formed to have the free ends 79 and 80 extending normally from the front surface of the panel. A pivot rod 82 is fixedly attached on its opposite ends to the extending ends of the tabs 77 and 78, and that rod 82 passes through the transverse bore 75 of the flap 74. Therefore the flap 74 will be hingedly mounted on the panel by hinge means 72 and will be free to flutter when air at the proper predetermmined velocity passes through the aperture 76 and impinges thereon.

Although the wind speed indicator 18 is shown and described as including three separate indicators, it will be understood that the number of indicators could be varied to suit the desired degree of accuracy. Further, it will be appreciated that the wind speed indicator 18 provides a reliable, relatively accurate, and inexpensive way of determining air speeds, and could be employed in conjunction with other weather instruments such as a barometer, hygrometer, and the like, or can simply be fabricated as a separate instrument.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. An apparatus for sensing and correlation of ambient conditions to produce a reading indicative of the effective ambient temperature, said apparatus comprising:
   (a) a panel;
   (b) a thermometer mounted on said panel and having a bulb like enlargement on one end thereof;
   (c) said panel havng an opening formed therethrough proximate the bulb of said thermometer to enhance the sensing of air movements and mean radiation by said thermometer;
   (d) a liquid absorbing material affixed to the bulb of said thermometer so as to cover a portion thereof, said thermometer sensing dry bulb temperature when said material is dry and producing a reading indicative thereof, said thermometer simultaneously sensing dry bulb temperature and wet bulb temperature when said material is wet and producing a reading approximately halfway therebetween;
   (e) wind indicator means on said panel for determining wind velocities; and
   (f) a correction scale on said panel alongside said thermometer for indicating temperature corrections to be applied to the readings of said thermometer for wind velocities determined by said wind indicator means.

2. An apparatus as claimed in claim 1 wherein said wind indicator means comprises:
   (a) said panel having an aperture formed therethrough;
   (b) a flap hingedly mounted on said panel and disposed to suspendingly overlay the aperture of said panel so that said flap will be deflectingly moved when air passing through the aperture is above a predetermined velocity; and
   (c) said flap and the aperture of said panel being sized to determine the velocity of air movement above which said flap will move.

3. An apparatus as claimed in claim 1 wherein said wind indicator means comprises:
   (a) a plurality of separate air speed indicators for sensing air movements, each of said air indicators producing an air movement indication at a different velocity thereof; and
   (b) each of said plurality of air speed indicators comprising,
     I. said panel having an aperture formed therethrough,
     II. a flap hingedly mounted on said panel and disposed to suspendingly overlay the aperture of said panel so that said flap will be deflectingly moved when air passing through the aperture is above a predetermined velocity, and
     III. said flap and the aperture of said panel being sized to determine the velocity of air movement required to move said flap.

4. An apparatus as claimed in claim 1 wherein said wind indicator means comprises:
   (a) said panel having a first, a second and a third aperture formed therethrough;
   (b) a first flap hingedly mounted on said panel so as to suspendingly overlay the first aperture formed in said panel, said first flap and the first aperture of said panel being sized so that air moving through that first aperture will deflectingly move said first flap at air velocities above one mph;
   (c) a second flap hingely mounted on said panel so as to suspendingly overlay the second aperture of said panel, said second flap and the second aperture of said panel being sized so that air moving through that second aperture will deflectingly move said second flap at air velocities above five mph; and
   (d) a third flap hingedly mounted on said panel so as to suspendingly overlay the third aperture of said panel, said third flap and the third aperture of said panel being sized so that air moving through that third aperture will deflectingly move said third flap at air velocities above 20 mph.

5. An apparatus as claimed in claim 1 and further comprising means on said panel for wetting said liquid absorbing material.

6. An apparatus as claimed in claim 1 and further comprising:
   (a) a water tank affixed to said panel; and
   (b) a manually operable shutoff valve on said water tank and extending therefrom proximate said liquid absorbing material so that water from said water tank may optionally be employed to wet said liquid absorbing material.

7. An apparatus as claimed in claim 1 wherein said correction scale comprises:

(a) an upper segment containing correction factors which align with and are to be applied to the readings of said thermometer above approximately 40° F.; and
(b) a lower segment containing correction factors which align with and are to be applied to readings of said thermometer below approximately 40° F.

8. An apparatus as claimed in claim 7 wherein said upper segment of said correction scale is provided with an area marked with a contrasting color to indicate a zone of effective temperatures where most people are comfortable.

9. An apparatus for indicating wind velocities comprising:
(a) a panel of substantially planar configuration;
(b) a plurality of air speed indicators on said panel for sensing air movements, each of said air speed indicators producing an air movement indication at a different velocity thereof; and
(c) each of said plurality of air speed indicators comprising,
  I. said panel having an aperture formed therethrough,
  II. a flap hingedly mounted on said panel and disposed to suspendingly overlay the aperture of said panel so that said flap will be deflectingly moved when air passing through the aperture is above a predetermined velocity, and
  III. said flap and the aperture of said panel being sized to determine the velocity of air movement that will produce movement of said flap.

* * * * *